No. 783,427. Patented February 28, 1905.

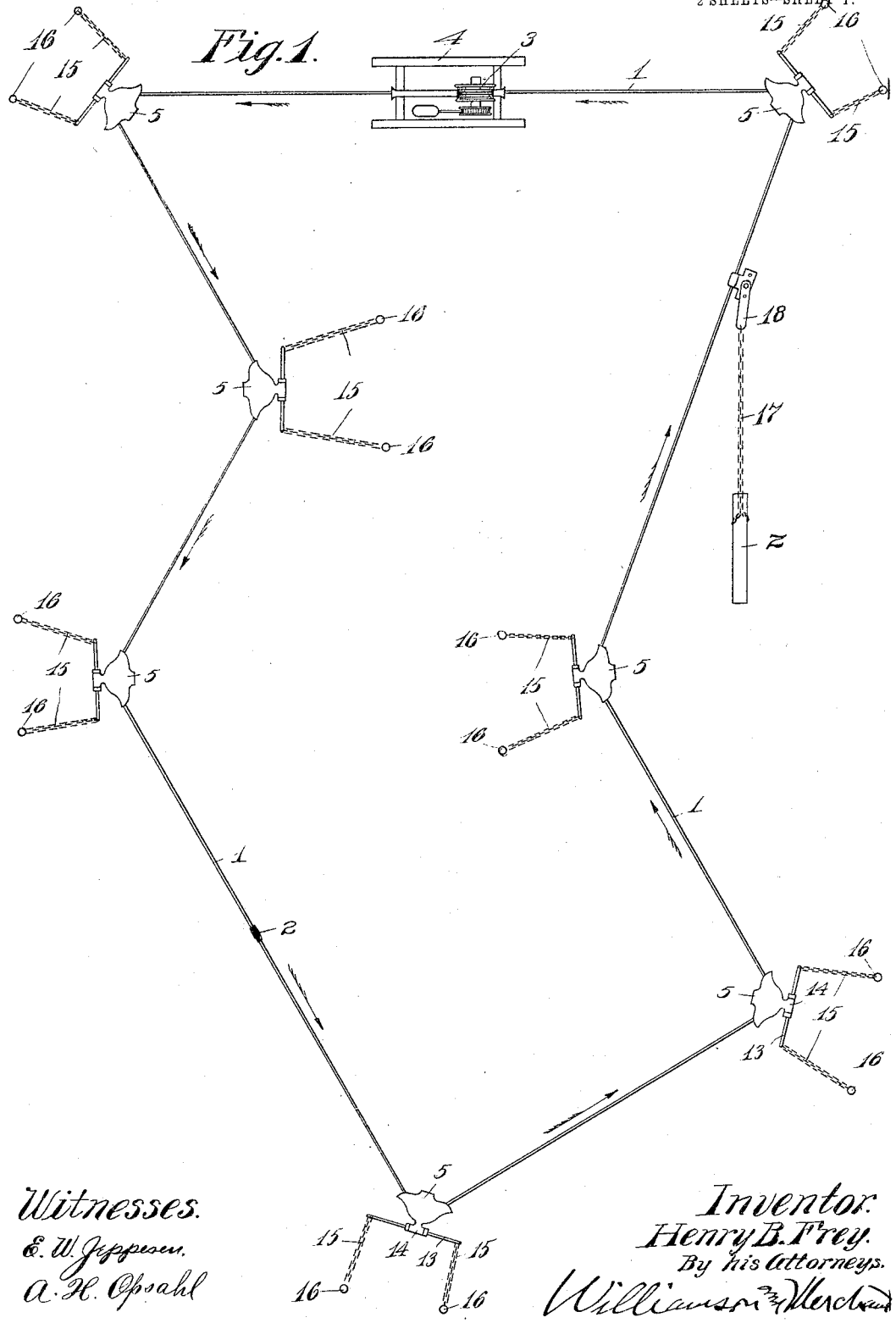

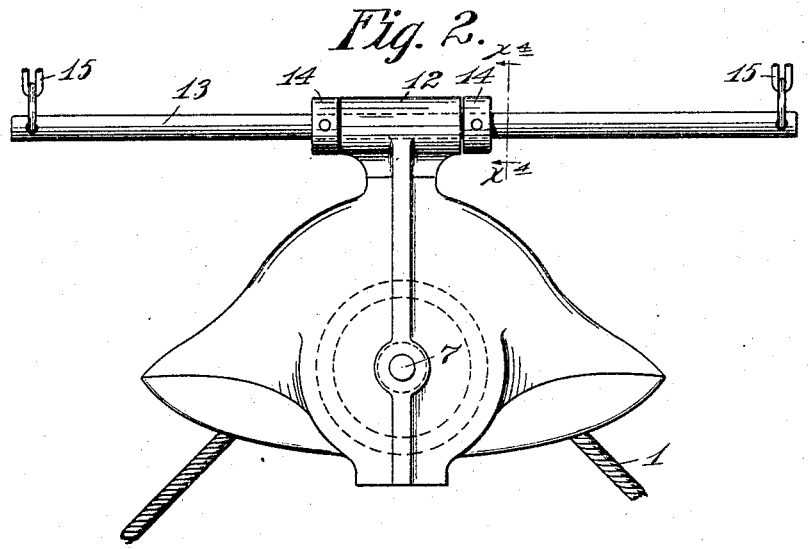
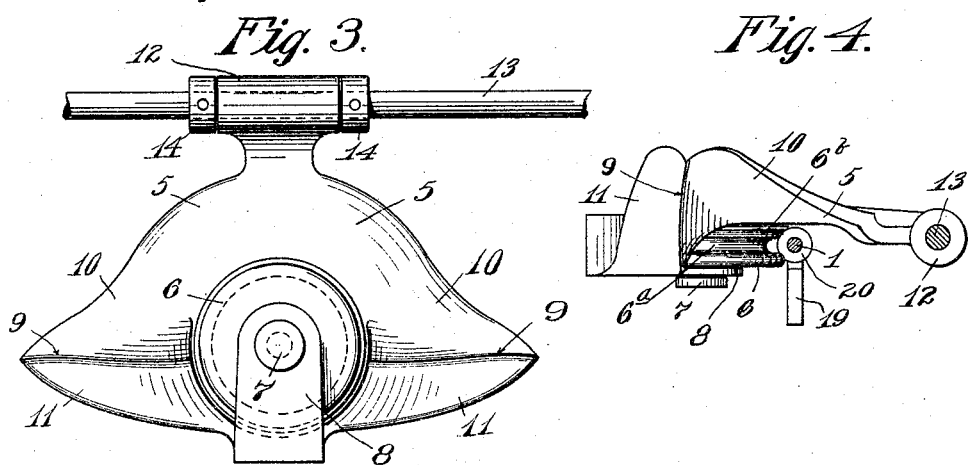
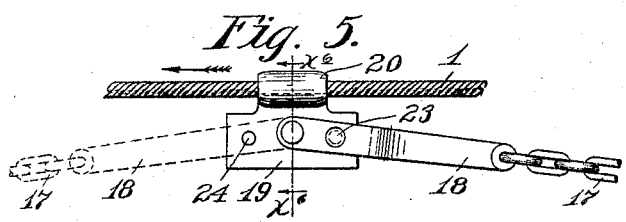
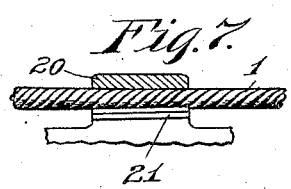
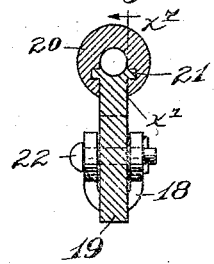

UNITED STATES PATENT OFFICE.

HENRY B. FREY, OF MINNEAPOLIS, MINNESOTA.

LOG-SKIDDING DEVICE.

SPECIFICATION forming part of Letters Patent No. 783,427, dated February 28, 1905.

Application filed June 20, 1904. Serial No. 213,245.

*To all whom it may concern:*

Be it known that I, HENRY B. FREY, a citizen of the United States, residing at Minneapolis, in the county of Hennepin and State of Minnesota, have invented certain new and useful Improvements in Log-Skidding Devices; and I do hereby declare the following to be a full, clear, and exact description of the invention, such as will enable others skilled in the art to which it appertains to make and use the same.

My present invention has for its especial object to provide an improved log skidding or hauling device for use in the woods to collect logs at various points and deliver the same at a desired point or station; and to the above ends the invention consists of the novel devices and combinations of devices hereinafter described, and defined in the claims.

In my present invention I use an endless flexible cable and drag the same by a local power device. As a local power device for driving the cable I preferably employ a driving-drum and power mechanism substantially like that shown and claimed in my prior application, Serial No. 199,510, filed March 22, 1904, entitled "Draft mechanism for logging-sleds;" but in the present instance the sled or support for the driving-drum and associated power mechanism is of course anchored to the ground.

The endless power-driven cable is guided at different points along the line of travel by means of tackle-blocks of novel construction, which tackle-blocks may be anchored in various different ways. The logs which are to be taken up and drawn to a common collecting-station are attached to the driving-cable preferably by short chains and coöperating grapples.

In practice the endless cable may have a very considerable length and in some instances may be as much as a mile in length, although it will usually be much shorter. In nearly all cases it will be necessary to cause the cable to follow a tortuous or irregular course, and the course of the cable will from time to time have to be shifted, so as to bring the cable in close proximity to the logs which are to be collected or taken up by said cable.

In the accompanying drawings, which illustrate my invention, like characters indicate like parts throughout the several views.

Figure 1 is a diagrammatic plan view illustrating the complete apparatus. Fig. 2 is a detail in plan, showing one of the tackle-blocks and its anchoring-bar removed from working position. Fig. 3 is a bottom plan view of the tackle-block shown in Fig. 2. Fig. 4 is a side elevation of the tackle-block shown in detail in Fig. 2, some parts being sectioned on the line $x^4$ $x^4$ of Fig. 2 and showing also a portion of one of the cable-grapples. Fig. 5 is a detail in plan, showing a portion of the cable and one of the cable-grapples. Fig. 6 is an enlarged section taken on the line $x^6$ $x^6$ of Fig. 5, and Fig. 7 is a detail in section on the line $x^7$ $x^7$ of Fig. 6.

The numeral 1 indicates the cable, the ends of which are connected by a coupling 2 of suitable construction. At the power-station this cable 1 is wrapped several times about a power-driven traction-drum 3, mounted on an anchored frame 4. The said drum and associated local parts of the power plant, as already indicated, are preferably of substantially the form set forth and claimed in my prior application above identified.

At different points along the line of the cable's travel the said cable is guided by tackle-blocks of novel construction, each of which comprises a cam-head 5 and a guide-sheave 6, which sheave is pivoted to the former by a bearing-pin 7. One side of the sheave 6 runs close against the body of the cam-head 5, and the other side of the said sheave—to wit, the under side thereof—is uncovered for approximately one hundred and eighty degrees. As shown, the cam-head 5 has an arm extension 8, that extends under the sheave 6 and affords a bearing for the lower end of the pivot-pin 7. Extended in diametrically opposite directions from the lower flange of the sheave 6 the cam-head 5 is formed with upwardly-inclined cam-ridges 9, from which cam-surfaces 10 and 11 incline upward.

At offset points, approximately ninety degrees distant from the cam-ridges 9, the cam-heads 5 are formed with bearing-sleeves 12, through which are passed anchoring-rods 13, held against endwise movements with respect to said sleeves by stop-collars 14. To the ends of the anchoring-rods 13 are attached chains 15 or other suitable anchoring devices, which are adapted for use to anchor the rods 13 to trees, tree-stumps, to driven stakes, or to other suitable bases of reaction.

In Fig. 1 the ends of the chains 15 are shown as anchored to bases of reaction, (marked 16,) and such bases of reaction may be assumed to be tree-stumps or driven stakes. In some instances, however, it may be desirable to anchor a tackle-block to a single tree, which may be done by passing both chains about the trunk and securing them together at their ends. In all cases, however, it is desirable to anchor the rods 13 so that they will extend at approximately the same angle to the cable on the opposite sides of the tackle-block. The tackle-blocks, of course, when applied in working position overlie the sleeves 6 and will be held suspended slightly above the ground by the tension of the cable 1, which is normally set under considerable strain. In order to prevent the cable from jumping off from the sheaves 6, it is necessary to normally set the same under considerable tension.

The devices for attaching the logs to the power-driven cable 1 as preferably constructed involve chains 17, which are attached to levers 18, pivotally attached to grapple-plates 19, which in turn are detachably secured to grapple-sleeves 20 by tongue-and-groove joints 21. The grapple-sleeves 20 when the plates 19 are removed are adapted to be placed straddle of the cable 1. The tongue-and-groove joints 21 extend at a slight angle to the cable-passage of the sleeve 20, so that when the said grapple-plate is slid into working position in a direction from the left toward the right with respect to Figs. 5 and 7 said plate 19 and sleeve 20 will be caused to tightly grip the cable and lock the grapple thereto. The lever 18 is pivotally attached to the plate 19 by a pin 22 and is adapted to be locked thereto against pivotal movements by a pin 23, passed through said lever and through the one or the other of a pair of perforations 24, formed in said plate 19.

To carry the logs from points along the line of travel of the cable when the cable is being moved in the direction indicated by the arrows marked on Fig. 1, the logs $z$ are attached to the right-hand portion of the cable, as viewed in Fig. 1—to wit, to that portion which is being moved toward the power device.

The sheaves 6, it will be noted, are formed with deep and relatively narrow grooves $6^a$, that receive the cable 1, and they are also formed with wider peripheral channels $6^b$, that are adapted to receive portions of the sleeves 20 of the grapple-plates 19 and to carry the same over the sheaves without causing the driving-cable 1 to run off from the said sheaves. The so-called "grapple-plates" 19 when they approach one of the tackle-blocks are liable to stand in almost any position—to wit, toward the right or toward the left or turned slightly upward or downward. The said grapple-plates must, however, be turned downward in order to permit their sleeves 20 to run over the sheaves 6, around which the grapple is making its turn. This action—to wit, the turning down of the grapple-plate—is insured by the form of the grapple-head 5. When the said grapple-plate approaches the guide-sheave around which it is to make its turn, if it happens to be turned upward or toward one side its free outer portion will engage either with the cam-surface 10 or 11, according to which position it occupies, and by the said engaged cam-surface will be positively turned downward, either in one direction or the other, and will be thereby caused to travel around the sheave, as shown in Fig. 4. In this way the grapples are guided around the tackle-blocks without throwing the driving-cable off from the sheaves of the said blocks. This construction is therefore of the utmost importance in the device of the character above described. The tackle-blocks being pivoted with freedom for vertical movements are free to adapt themselves to the lines of strain applied thereto from the cable 1 and from the drag of the load.

The cable 1 is preferably a wire cable, but may of course be constructed of any suitable material and in any suitable form.

The detachable grapples may be applied to the cable at such points as may be necessary to attach the logs. The logs would preferably be attached to the cable while the cable is standing still. In practice it would probably be advisable to attach logs to one half-section of the cable and by movement of the cable draw the logs to the delivery or depositing station and then attach logs to the other half-section of the cable and draw the same to the depositing-station under a reverse movement of the cable. In this way logs would be drawn to the depositing-station under such movements of the cable as are necessary in order to return the grapples which were previously used to draw the logs to the depositing-station. When the grapples are being returned from the depositing-station back to points where logs are to be connected thereto, the levers 18 should be turned back into the dotted-line position indicated in Fig. 5. Of course, if desirable, the grapples could be removed from the cable at the depositing-station and carried back to the points where they are to be applied to the logs by means independent of the cable, and in this case the cable might be driven always in the same direction, or with the cable running in a constant direction the grapples could be removed at the depositing-station from the cable on one side of the power mechanism and again applied thereto on the opposite side of the power mechanism, in which case the cable would serve to carry the grapples back to the points where they were to be applied to the logs. The coupling 2 will readily pass over the sheaves 6 of the tackle-blocks and will also readily pass around the driving-drum 3 and through the guiding devices of the power mechanism at the delivery-station.

The so-called "delivery-station" may be in close proximity with the local power mechanism or it may be at any other suitable point along the line of travel of the cable. From what has been said it will of course be understood that the mechanism described is capable of many modifications within the scope of my invention as herein set forth and claimed. It will also be understood that the device, while especially adapted for skidding logs in the woods, is capable of various other uses as a means for transporting various kinds of loads.

What I claim, and desire to secure by Letters Patent of the United States, is as follows:

1. The combination with a cable and means for driving the same, of tackle-blocks anchored along the line of travel of said cable, and guiding the same, and a load-attaching grapple applied to said cable, said tackle-blocks having sheaves supported from one side so that said grapple may pass by the same with its load, substantially as described.

2. The combination with an endless cable and means for driving the same, of tackle-blocks anchored along the line of the cable's travel and having guide-sheaves over which the cable is drawn, and load-attaching grapples applied to said cable, the head of said tackle-blocks having cam-surfaces engageable with said grapples and operating thereon, to direct the same over the said guide-sheaves, substantially as described.

3. The combination with a cable and local means for driving the same of tackle-blocks guiding said cable and determining the line of travel thereof, and load-attaching grapples applied to said cable, said tackle-blocks comprising heads 5 formed with cam-surfaces 9 and 10, and provided with guide-sheaves 6 exposed at the lower sides, and said grapples comprising sleeves 20 and plates 19, which sleeves 20 are adapted to pass over said sheaves 6, and which plates 19 are turned downward by the cam-surfaces 10 and 11 of said heads 5, substantially as described.

4. The combination with an endless cable, guides determining the line of travel thereof, and means for driving said cable, of load-attaching grapples applied to said cable and having pivotally-reversible arms, substantially as described.

In testimony whereof I affix my signature in presence of two witnesses.

HENRY B. FREY

Witnesses:
R. C. MABEY,
F. D. MERCHANT.